United States Patent [19]
Brede et al.

[11] Patent Number: 5,931,496
[45] Date of Patent: Aug. 3, 1999

[54] GAS GENERATOR, INTENDED IN PARTICULAR FOR USE WITH AN AIRBAG, WITH A CHARGE CONTAINER AND A FLAME GUIDE PIPE

[75] Inventors: Uwe Brede, Furth; Josef Kraft, Berg; Gerrit Scheiderer, Furth; Michael Schmid, Graefenberg, all of Germany

[73] Assignee: Dynamit Nobel GmbH Expolsivstoff-und Sytemtechnik, Troisdorf, Germany

[21] Appl. No.: 08/894,882

[22] PCT Filed: Mar. 1, 1996

[86] PCT No.: PCT/EP96/00843
  § 371 Date: Jan. 21, 1998
  § 102(e) Date: Jan. 21, 1998

[87] PCT Pub. No.: WO96/26851
  PCT Pub. Date: Sep. 6, 1996

[30] Foreign Application Priority Data

Mar. 2, 1995 [DE] Germany .......................... 195 07 208

[51] Int. Cl.⁶ .................................................. B60R 21/26
[52] U.S. Cl. ............................................ 280/741; 102/531
[58] Field of Search ..................................... 280/741, 736; 102/530, 531

[56] References Cited

U.S. PATENT DOCUMENTS

| | | | |
|---|---|---|---|
| 3,715,131 | 2/1973 | Hurley et al. | 280/736 |
| 3,972,545 | 8/1976 | Kirchoff et al. | 280/741 |
| 4,370,930 | 2/1983 | Strasser et al. | 280/741 |
| 4,468,016 | 8/1984 | Kobari et al. | 280/741 |
| 5,443,286 | 8/1995 | Cunningham et al. | 280/741 |
| 5,447,105 | 9/1995 | Bauer et al. | 280/741 |
| 5,471,932 | 12/1995 | Kraft et al. | 280/741 |

FOREIGN PATENT DOCUMENTS 43 93 229  7/1994  Germany .

*Primary Examiner*—Peter C. English
*Attorney, Agent, or Firm*—Antonelli, Terry, Stout & Kraus, LLP

[57] ABSTRACT

A gas generator, particularly for an airbag, is characterized in that the gas-producing material (6) is arranged in a hermetically sealed charge container (9) and that a flame guide tube (10) is arranged in the charge container (9), which flame guide tube is formed in one piece with the charge container (9) and has only one flame outlet aperture (11).

11 Claims, 2 Drawing Sheets

GAS GENERATOR, INTENDED IN PARTICULAR FOR USE WITH AN AIRBAG, WITH A CHARGE CONTAINER AND A FLAME GUIDE PIPE

BACKGROUND OF THE INVENTION

The invention relates to a gas generator, particularly for an airbag, having a cylindrical outer tube, the open front ends of which are sealed by cover elements, an inner tube of smaller diameter which is arranged coaxially inside the outer tube and has discharge apertures, an ignitable gas producing material inside the inner tube, filter elements in the annular chamber between the inner and outer tubes, and an ignition unit to ignite the gas producing material.

A gas generator of this kind is known from DE 43 24 554 A1 for example. This known gas generator has a cylindrical outer tube which represents the housing of the gas generator and the open front ends of which are sealed by cover elements. A cylindrical inner tube of smaller diameter is coaxially arranged in the outer tube; this internal tube defines the limits of the combustion chamber, in which a gas-producing material which can be ignited by means of an ignition unit is accommodated, and is provided with several discharge apertures in the tube wall. In the annular chamber between the inner and the outer tubes is a filter element which generally comprises a multiplicity of layers of wire mesh, steel wool and/or metal fibre fleece. The combustion gas which emerges from the discharge apertures of the inner tube flows through the filter elements which absorb solid and liquid and/or condensed combustion products and escapes, cleaned, via gas outlet apertures in the outer tube.

In order to obtain constant aperture gas pressures at all temperatures, a rolled, self-overlapping insulating strip which at least partially lies against the wall is arranged in the inside of the inner tube in order to insulate the discharge apertures.

On the outside of the inner tube the discharge apertures are covered with a sealing strip to seal against moisture.

A gas generator in which the gas-generating material is arranged in a charge container made of a metal foil is known from U.S. Pat. No. 4,131,299. This has the advantage that an additional insulating strip and sealing strip can be dispensed with. Furthermore, the assembly of the gas generator is substantially simplified as the charge container can be filled away from the actual production line and further processed in the sealed condition. This substantially increases safety.

A gas generator arrangement with a flame guide tube is known from DE 43 93 229 T1. This tube extends in the axial direction of the housing and a multiplicity of apertures are formed in the side wall of the flame guide tube. The outside of the flame guide tube thus defines the flame guiding. Furthermore, intensifier charges are accommodated in the flame guide tube. The shock wave or flame from the ignition charge and/or intensifier charge moves through the flame guide tube and finds its way through the apertures into the gas-generating charge and ignites it. The number and position of the apertures is selected in such a way that the gas-generating charge is "over-ignited". This means that the gas-generating charge is ignited at a multiplicity of different places in order to ensure that the pressure of the generated gas exhibits no undesirable pressure peaks, so as to ensure controlled burning.

SUMMARY OF THE INVENTION

The object underlying the invention is to improve a gas generator of the type described above in such a way that the gas-generating charge is safe and easy to handle on assembly on the one hand and that the combustion chamber pressure and hence the generator performance is adjustable on the other hand.

This object is achieved according to the invention in that the gas-producing material is arranged in a hermetically sealed charge container and that a flame guide tube which is formed in one piece with the charge container and has only one flame outlet aperture is arranged in the charge container.

The use of a hermetically sealed charge container has the advantage that no insulating strip and no sealing strip needs to be used. Furthermore, assembly is substantially simplified. The use of a flame guide tube which has only one flame outlet aperture enables the combustion chamber pressure to be adapted to the requirements. Because the flame guide tube is formed in one piece with the charge container, the latter is inexpensive to manufacture.

Advantageously the distance a between the centre of the flame outlet aperture and the centre of the discharge apertures of the inner tube is calculated according to the formula $$a = d \pm 50\%,$$

wherein d is the internal diameter of the inner tube. This gives an optimal combustion chamber pressure. This formula means that the distance a is in the region between d−50% and d+50%, i.e. between 0.5 d and 1.5 d.

In a preferred embodiment the distance a is approximately 80% of the internal diameter d of the inner tube.

According to the invention the charge container is a box-type container made of aluminium by extrusion or deep-drawing, which is sealed with a cover. The flame guide tube is conveniently arranged on the front of the container facing away from the cover.

Advantageously the cover is sealed to the container via a fold and the base region of the charge container is formed to be reinforced with the moulded-on flame guide tube.

In order that the ignition jet of the ignition element can make its way into the flame guide tube, the wall thickness of the charge container upstream of the flame guide tube is conveniently designed as a membrane.

In a preferred embodiment the wall thickness of the charge container is approximately 0.5 mm and the wall thickness of the membrane approximately 0.15 mm.

A spring-loaded disc element or a ceramic fibre ring is advantageously arranged in the charge container as a damping element and volume equalizer. This means that the gas-generating charge is accommodated so as to be protected from impact.

If required, an intensifier charge can also be accommodated in the flame guide tube.

BRIEF DESCRIPTION OF THE DRAWINGS

Further features will emerge from the figures which are described in detail below.

DETAILED DESCRIPTION OF THE PREFERRED EMBODIMENTS

Figure 1:
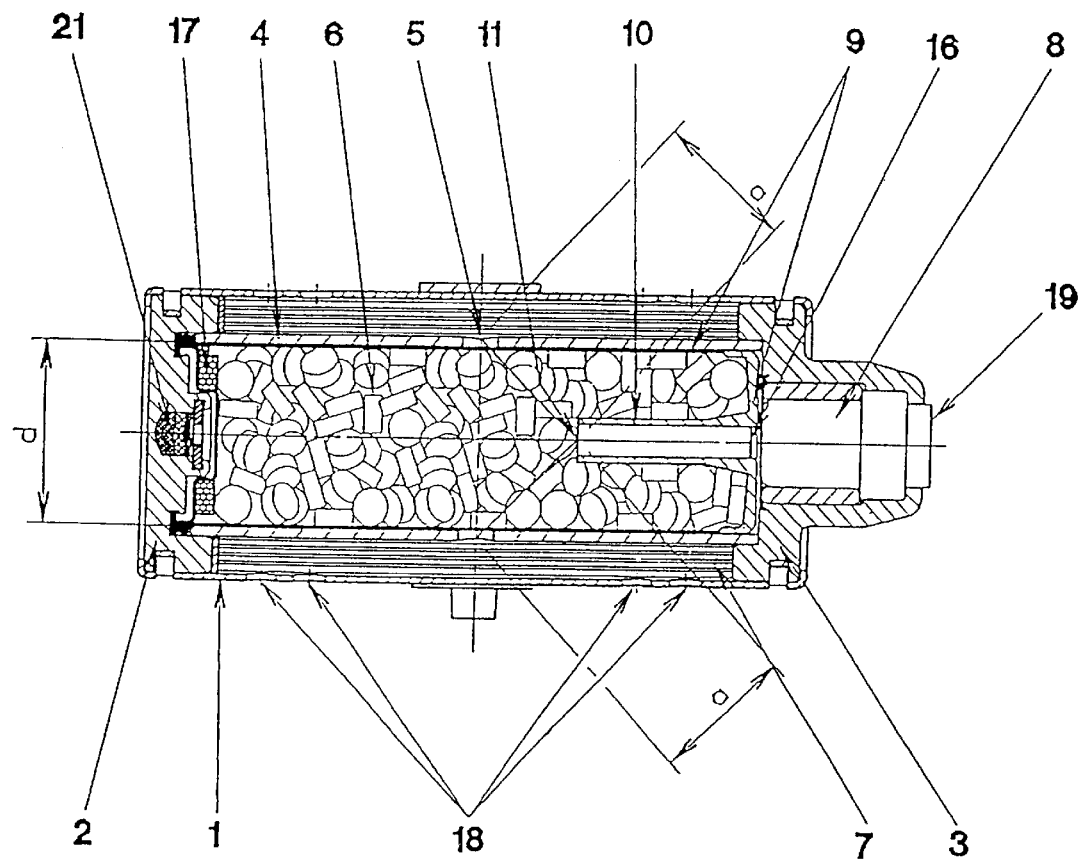
FIG. 1 shows a gas generator according to the invention in section.

FIG. 1 shows a gas generator, particularly for a motor vehicle passenger impact protection cushion (also known as an "airbag"). The gas generator has an outer tube 1 of special steel, in the casing of which several gas outlet apertures 18 are formed. The gas outlet apertures 18 are arranged uniformly distributed around four circumferential lines of the outer tube 1. The gas outlet apertures 18 are substantially in the outward section—viewed in the axial longitudinal extension of the gas generator—of the outer tube 1. An inner tube 4 of special steel is accommodated inside the outer tube 1 and coaxially with respect to it. Discharge apertures 5 are also formed in the centre of the casing of the inner tube 4, with these discharge apertures 5 being arranged uniformly distributed on a circumferential line of the inner tube 4. There is therefore an axial spacing between the gas outlet apertures 18 of the outer tube 1 and the discharge apertures 5 of the inner tube 4.

The external diameter of the inner tube 4 is smaller than the internal diameter of the outer tube 1, so that there is an annular chamber between the outer tube 1 and the inner tube 4 as already described. This annular chamber is filled with filter elements 7 (special steel wire mesh mats, for example).

The inner tube 4 and/or a charge container 9 arranged therein is filled with gas-producing material 6 which generates gas under pressure when it undergoes combustion. The gas-producing material 6, also called compressed-gas-generating charge, is in the form of so-called pellets which are accommodated in the charge container 9 in a disordered manner. An electrical ignition unit 8 to ignite the gas-producing material 6 is fixed to a cover element 3 and projects beyond the front of the charge container 9. The ignition unit 8 can be connected to an electronics unit via a connector 19.

Figure 2:
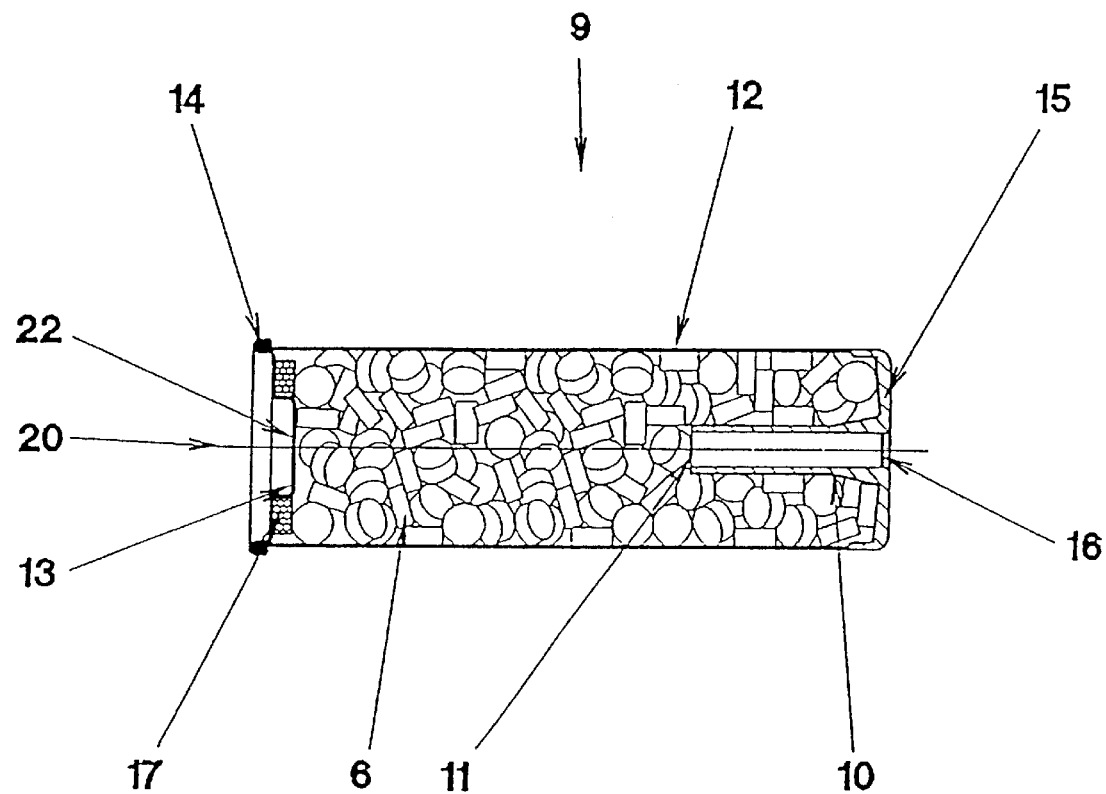
FIG. 2 shows the charge container according to FIG. 1 on an enlarged scale.

The charge container 9 comprises a container 12, made from aluminium by extrusion or deep-drawing, which is sealed with a cover 13. (See FIG. 2 in particular, which shows the charge container 9 of FIG. 1 on an enlarged scale). The base region 15 of the container 12 is formed in a reinforcing manner. A flame guide tube 10 projecting into the inside of the charge container 9 is moulded onto it. The flame guide tube is arranged centrally on the longitudinal axis 20 of the charge container 9. The front end or inlet of the flame guide tube 10 is sealed with a membrane 16 which is penetrated by the ignition jet of the ignition unit 8 which is adjacent to the inlet of the flame guide tube 10. Thus, the membrane 16 seals the inlet and is provided between the inlet of the flame guide tube 10 and the ignition unit 8. The wall thickness of the charge container 9 upstream of the flame guide tube 10 is conveniently designed as the membrane 16. The wall thickness of the charge container 9 is approximately 0.5 mm and the wall thickness of the membrane 16 is approximately 0.15 mm. The cover 13 is arranged on the front face opposite the flame guide tube 10. The edge of the cover 13 is connected to the container 12 in a gas-tight manner via a fold 14. For sealing purposes, the sealing position in front of the fold is provided with a sealing material such as synthetic rubber. The gas-generating charge 6 is arranged inside the charge container 9 in the form of so-called pellets.

On the inside of the cover 13 are arranged sprung compressible disc elements 17 of ceramic felt or fabric, which are supported against the pellets on the one hand and against the inner surfaces of the cover 13 on the other hand, with the disc elements holding the pellets together by spring force. The purpose of the sprung disc elements 17 is to equalize the capacity tolerances of the charge container 9 and to hold the pellets together including when the charge container 9 is not completely filled with gas-producing material 6 or the packing density of the pellets is increased by vibrations in the course of time.

A thermal fuse 21 which initiates a combustion of the gas-producing material in the event of danger, e.g. at ambient temperatures that are too high, is also provided in the cover element 2. For this purpose the cover 13 is provided with a diaphragm 22 on the side opposite the thermal fuse 21.

An essential feature of the invention is the length of the flame guide tube 10. The distance a (see FIG. 1) between the centre of the flame outlet aperture 11 and the centre of the discharge apertures 5 in the inner tube 4 should be calculated according to the formula $$a = d \pm 50\%,$$

wherein d is the internal diameter of the inner tube 4. Preferably the distance a is approximately 80% of the internal diameter d of the inner tube 4. This causes the combustion chamber pressure to develop in the desired orders of magnitude. The flame guide tube 10 projects into the charge container 9 a predetermined length along which the flame guide tube 10 is surrounded by the gas producing material 6 provided in the annular space between the flame guide tube 10 and the inner tube 4.

The mode of operation of the gas generator illustrated in FIG. 1 will be described below. The electrical ignition unit 8, which is, for example, a so-called layered bridge-wire cap with primer, is ignited by a defined electrical pulse. When the gas generator according to FIG. 1 is used as a compressed gas generator in a vehicle airbag, this electrical pulse is applied to the ignition unit 8 by the closure of an inertia switch, for example, in the event of the motor vehicle colliding with another object. A so-called intensifier charge is ignited in the ignition unit 8; the ignition fumes which are created (flame, gas, hot combustion products) reach the gas-producing material 6 via the diaphragm 16 and the flame guide tube 10 where they ignite the (propellent charge) pellets. The hot gases reach the filter elements 7 via the discharge apertures 5. The purpose of the filter elements 7 is to cool the gases and clean them of particles (solids) and condensates. The gases cooled and cleaned in this way escape via the gas outlet apertures 18 in the outer tube 1.

Before the hot gases can leave the inner tube 4 through the discharge apertures 5, the gas pressure must be so high that the charge container 9 is torn open.

We claim:

1. Gas generator comprising a cylindrical outer tube having open front ends sealed by cover elements, an inner tube of smaller diameter which is arranged coaxially inside the outer tube and has discharge apertures, an ignitable gas-producing material arranged in a hermetically sealed charge container inside the inner tube, filter elements in an annular chamber between the inner tube and the outer tube, an ignition unit to ignite the gas-producing material, wherein the hermetically sealed charge container includes a flame guide tube formed in one piece with the charge container and having only one flame outlet aperture and an inlet adjacent the ignition unit, wherein the distance a between the centre of the flame outlet aperture and the centre of the discharge apertures of the inner tube is calculated according to the formula $$a = d \pm 50\%,$$

wherein d is the internal diameter of the inner tube.

2. Gas generator according to claim 1, wherein the distance a is approximately 80% of the internal diameter d of the inner tube.

3. Gas generator according to claim 1, wherein the charge container is an extruded or deep drawn container made of aluminum and is sealed with a cover.

4. Gas generator according to claim 3, wherein the cover is sealed to the container via a fold.

5. Gas generator according to claim 1, wherein the flame guide tube is molded on a base region of the charge container.

6. Gas generator according to claim 1, further comprising a membrane sealing the inlet of the flame guide tube is designed as a diaphragm provided between the inlet and the ignition unit.

7. Gas generator according to claim 6, wherein a compressed disc element is arranged in the charge container as a damping element and volume equalizer.

8. Gas generator according to claim 6, wherein the membrane is a wall of the charge container.

9. Gas generator according to claim 8, wherein the wall thickness of the membrane is less than the wall thickness of the remainder of the charge container.

10. Gas generator according to claim 9, wherein the wall thickness of the membrane is approximately 0.15 mm.

11. Gas generator according to claim 1, wherein the flame guide tube projects into the charge container a predetermined length along which the flame guide tube is surrounded by the gas producing material provided in an annular space between the flame guide tube and the inner tube.

* * * * *